United States Patent [19]

Nanyoshi et al.

[11] Patent Number: 4,785,784
[45] Date of Patent: Nov. 22, 1988

[54] FUEL INJECTION CONTROL SYSTEM FOR INTERNAL COMBUSTION ENGINE

[75] Inventors: Yasutoshi Nanyoshi, Yokosuka; Katsunori Oshiage, Yokohama, both of Japan

[73] Assignee: Nissan Motor Co., Ltd., Japan

[21] Appl. No.: 121,351

[22] Filed: Nov. 16, 1987

[30] Foreign Application Priority Data

Nov. 18, 1986 [JP] Japan .................. 61-276159
Nov. 27, 1986 [JP] Japan .................. 61-283920

[51] Int. Cl.⁴ ................ F02D 41/26; F02M 51/00
[52] U.S. Cl. ................................. 123/478; 123/480
[58] Field of Search ......... 123/299, 478, 480, 491, 123/492, 493, 494, 179 L; 364/431.05, 431.10

[56] References Cited

U.S. PATENT DOCUMENTS

| | | | |
|---|---|---|---|
| 3,747,575 | 7/1973 | Eisele et al. | 123/492 X |
| 4,173,208 | 11/1979 | Fenne et al. | 123/299 X |
| 4,200,063 | 4/1980 | Bowler | 123/478 |
| 4,242,992 | 1/1981 | Kawamura et al. | 123/491 |
| 4,407,251 | 10/1983 | Nakanishi | 123/299 X |
| 4,724,816 | 2/1988 | Kanno et al. | 123/478 X |

FOREIGN PATENT DOCUMENTS

| | | |
|---|---|---|
| 0029733 | 2/1984 | Japan . |
| 0211731 | 11/1984 | Japan . |
| 0195347 | 10/1985 | Japan . |
| 0233353 | 11/1985 | Japan . |
| 0076143 | 5/1986 | Japan . |

*Primary Examiner*—Willis R. Wolfe
*Attorney, Agent, or Firm*—Leydig, Voit & Mayer

[57] ABSTRACT

A control system for injecting fuel twice in each operating cycle of an internal combustion engine is provided with a control unit which comprises a first section for determining a desired injection quantity in accordance with an engine load and other engine operating parameters, a second section for determining a first fuel injection quantity from a recent value of the desired quantity and commanding the first injection, a third means for determining a compensation fuel quantity for compensating for a change of the desired quantity after the first injection by subtracting a more recent value of the desired quantity from the recent value used for determining the first injection quantity, and a fourth section for determining a second fuel injection quantity from the compensation quantity.

11 Claims, 9 Drawing Sheets

FUEL INJECTION CONTROL SYSTEM FOR INTERNAL COMBUSTION ENGINE

BACKGROUND OF THE INVENTION

The present invention relates to fuel injection control systems for engines such as engines of automobiles, and more specifically to fuel injection control systems for injecting fuel twice or more times in each engine operating cycle.

Japanese patent provisional publications Nos. 60-195347, 60-233353, 59-211731 and 59-29733 disclose fuel injection control systems designed to meet recent demands for better fuel economy, speedier response, higher output and further improvement in emission control in all operating conditions.

These conventional injection systems are arranged to determine the injection timing and the fuel injection quantity in accordance with engine rpm, engine load and other engine operating parameters, and advance the injection timing so that the fuel can be correctly introduced into the engine within the suction stroke even when the fuel is enriched.

In these systems, however, it is difficult or practically impossible to choose the injection timing so as to satisfy both of conflicting requirements in steady state and transient state because these system inject the fuel only once in each cycle. Therefore, these systems are unable to provide satisfactory engine stability and response in some cases. During steady state operation, it is required to sufficiently advance the fuel injection timing relative to the intake stroke in order to promote evaporation of the fuel and achieve satisfactory combustion. During transient state, on the other hand, it is desired to vary the fuel quantity so as to follow a change of the engine load immediately by retarding the fuel injection timing as late as possible insofar as it is not too late for the intake stroke. These conflicting requirements in the steady and transient states cannot be satisfied by these conventional systems.

Japanese utility model provisional publication No. 61-76143 discloses another example in which the fuel is injected twice in each combustion cycle of the engine. The injection control system of this example is arranged to set first and second injection timings and determines a quantity of the fuel supplied at the first injection timing in each cycle and a quantity of the fuel at the second timing in accordance with engine load and intake air temperature. In this system, however, changes in the required fuel quantity due to changes in the fuel injection timing and the engine load are not taken into consideration. Therefore, this system cannot follow up a change of the engine load between the instant of the first fuel injection and the intake stroke, so that a deficiency of the fuel supply is left when the engine load is increased.

Figure 8:
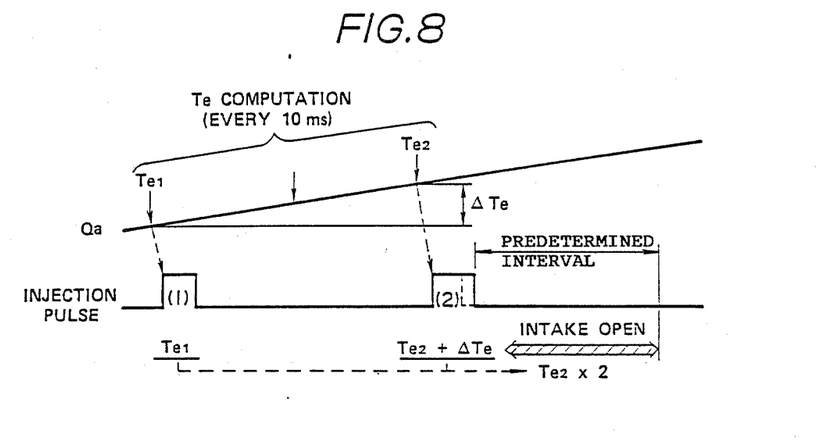
FIGS. 8 and 9 are timing charts showing operations of the fuel injection control system of the first embodiment.

When, for example, an intake air flow rate Qa is increasing as shown in FIG. 8, a fuel quantity Te corresponding to the intake air amount per one revolution of the engine is increased from a value $Te_1$ obtained at the time of the first injection to a value $Te_2$ obtained at the time of the second injection. In this case, the total fuel quantity per two-revolution cycle amounts to $2 \times Te_2$ whereas the actual supply per cycle amounts only to $Te_1 + Te_2$ which is smaller than $2 \times Te_2$ when $Te_1$ and $Te_2$ are directly used. Therefore, the fuel supply is deficient by a difference $\Delta Te = Te_2 - Te_1$.

SUMMARY OF THE INVENTION

It is an object of the present invention to provide a fuel injection control system capable of improving response, drivability and fuel economy of an internal combustion engine in steady state, transient state and idling operations by adequately adapting the fuel supply to changes in engine operating conditions.

According to the present invention, a fuel injection control system for an internal combustion engine comprises (i) means for sensing a load of the engine, (ii) means for sensing a crank angle of the engine, (iii) ignition timing determining means for determining a timing of a first fuel injection to be performed in each operating cycle of the engine and a timing of a second fuel injection to be performed after the first injection in each cycle, (iv) injection quantity determining means for determining a first injection quantity of fuel to be supplied by the first injection and a second injection quantity to be supplied by the second injection, (v) output means connected with the crank angle sensing means, the timing determining means and the quantity determining means for producing a first fuel injection signal indicative of the first injection quantity and a second fuel injection signal indicative of the second injection quantity, and (vi) injector means for supplying the fuel to the engine by spraying the fuel twice in each cycle in response to the first and second injection signals.

The injection quantity determining means comprises first means connected with the load sensing means for determining a desired fuel quantity in accordance with the load of the engine, second means for determining the first injection quantity from the desired quantity, third means for determining a compensation fuel quantity for compensating for a change in the desired quantity between a time of the and fourth means for determining the second injection quantity from the compensation quantity.

DETAILED DESCRIPTION OF THE INVENTION

Figure 1:
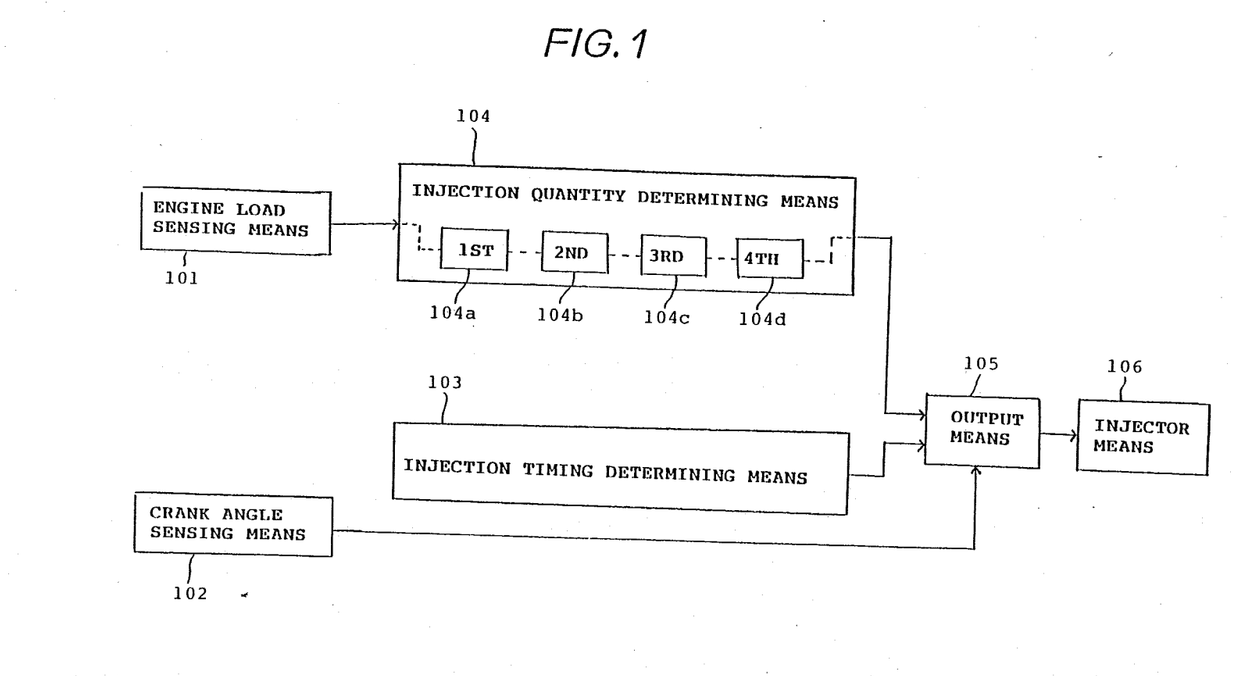
FIG. 1 is a block diagram schematically showing a fuel injection control system of the present invention.

As schematically shown in FIG. 1, a fuel injection control system of the present invention basically includes a means 101 for sensing an engine load, a means 102 for sensing a crank angle of the engine, a means 103 for determining fuel injection timings of first and second injections to be performed in each cycle, a means 104 for determining fuel injection quantities of the first and second injections, an output means 105 for producing first and second injection signals, and an injector means 106 for supplying the fuel to the engine by spraying the fuel twice in each cycle in response to the first and second injection signals. The fuel injection quantity determining means 104 includes a first means 104a for determining a desired fuel quantity in accordance with the engine load, a second means 104b for determining te first injection quantity of the first injection from the desired quantity, a third means 104c for determining a compensation quantity for compensating for a change in the desired quantity between a time of the first injection and a time of the second injection, and a fourth means 104d for determining the second injection quantity from the compensation quantity.

A first embodiment of the present invention is shown in FIGS. 2-9.

Figure 2:
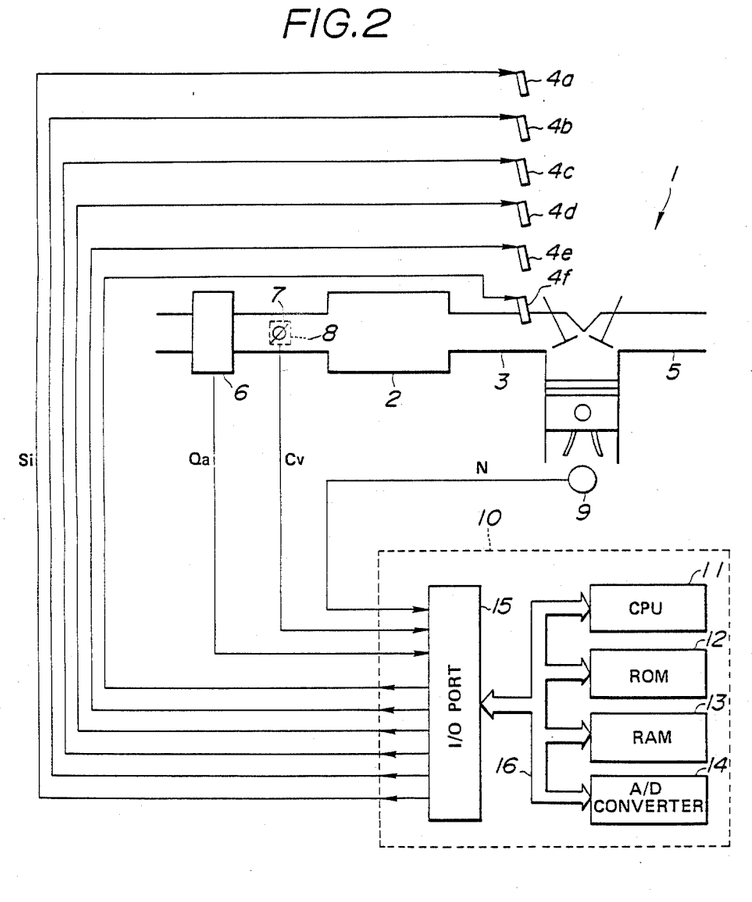
FIG. 2 is a schematic view of a fuel injection control system according to a first or second embodiment of the present invention.

An engine 1 of this example has six cylinders, each of which is supplied with intake air through an intake pipe 2 and an intake manifold 3. There are provided six fuel injectors 4a-4f. Each cylinder is provided with one injector 4a, 4b, ... or 4f. Each injector 4 (i.e., 4a, 4b, ... or 4f) injects fuel in response to one of six fuel injection signals Si. An exhaust pipe 5 conveys exhaust gas mixture from each cylinder to a catalytic converter (not shown) for emission control.

An air flow meter 6 is provided for measuring a flow rate Qa of the intake air, which is controlled by a throttle valve 7 disposed in the intake pipe 2. A throttle opening sensor 8 is arranged to sense an opening degree Cv of the throttle valve 7. A crank angle sensor 9 senses an engine rpm N of the engine 1. There are further provided a starter switch, an idle switch, a water temperature sensor, an oxygen sensor etc. for monitoring other engine operating conditions.

A control unit 10 is connected with the airflow meter 6, the throttle opening sensor 8, the crank angle sensor 9 and the other sensors and switches. The control unit 10 performs a fuel injection control in accordance with signals delivered from these sensors and switches. The control unit 10 includes CPU 11, ROM 12, RAM 13, A/D converter 14, and I/O port 15, which are connected with one another by a common bus 16. The A/D converter 14 converts analog input signals such as the signal Qa into digital signals, and delivers the digital signals to the CPU 11 or the RAM 13 under the control of the CPU 11. The CPU 11 processes data to determine various quantities required for the fuel injection control by reading data and transfering data to and from the RAM 13 according to programs stored in the ROM 12, and provides the results to the I/O port 15. The I/O port 15 receives the signals of the sensors and switches, and outputs the injections signals Si. The ROM 12 stores the programs, and the RAM stores data in the form a data map or in other forms. A part of the RAM 13 is arranged to retain information such as values obtained by a learning control in the absence of power by using a nonvolatile memory, for example.

Figure 3:
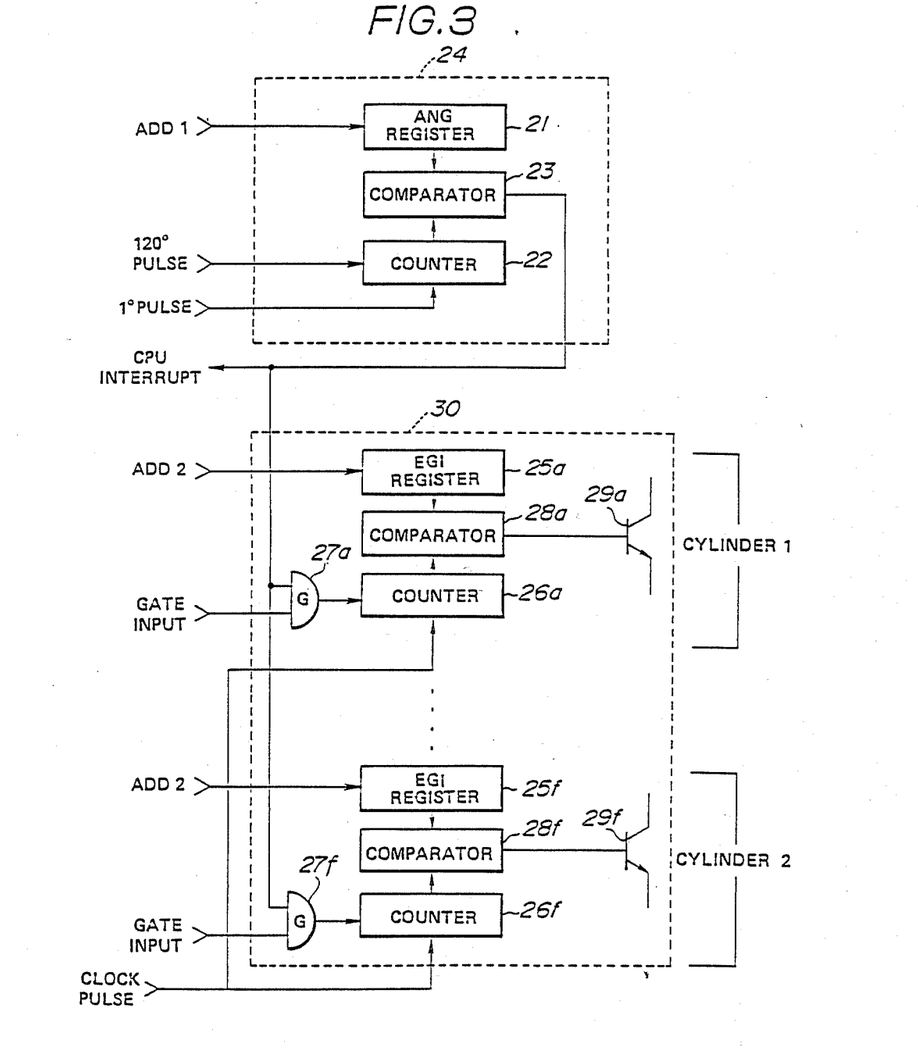
FIG. 3 is a block diagram showing an injector control circuit of the control system of FIG. 2.

FIG. 3 shows an injector control circuit of the control unit 10 in the form of a block diagram. The injector control circuit of FIG. 3 includes an injection start angle control circuit 24 and an injection pulse width output circuit 30.

The injection start angle control circuit 24 includes an ANG (angle) register 21, a comparator 23 and a counter 22. An injection start angle ADD1 is entered in the ANG register 21. The counter 22 is reset by each 120° pulse of the crank angle sensor 9, and counts 1° pulses of the crank angle sensor 9. The comparator 23 reads ADD1 stored in the ANG register 21 when the counter 22 is reset, and an output signal of the comparator 23 is changed to an ON state when the count of the counter 22 becomes equal to ADD1 read from the ANG resister 21. This comparator output signal is delivered to the CPU 11 and gates 27a-27f of the injection pulse width output circuit 30. In the CPU 11, the comparator output signal causes a fuel injection interrupt.

The injection pulse width output circuit 30 is constituted by six sections each including an EGI (fuel injection) register 25 (i.e., 25a, 25b, 25c, ... or 25f), a counter 26 (i.e., 26a, ... or 26f), a gate 27 (i.e., 27a, ... or 27f), a comparator 28 (i.e., 28a, ... or 28f), and a power transistor 29 (i.e., 29a, ... or 29f). Each of these six sections is assigned to a unique one of the six cylinders of the engine 1. FIG. 3 shows only the first section 25a-29a for controlling the No. 1 cylinder and the sixth section for the No. 6 cylinder, and the remaining sections are omitted for simplification.

In each section of the circuit 30, an injection pulse width (, or an injection pulse duration,) ADD2 is entered in the EGI register 25. The gate 27 of each section receives a gate input signal and the output signal of the comparator 23, and resets the counter 26 of that section when the gate input signal is in the ON state, and at the same time the output of the comparator 23 turns from OFF to ON. The counter 26 of each section is thus reset by the gate 27, and counts clock pulses. In each section, the comparator 28 reads ADD2 stored in the EGI register 25, and at the same time turns the power transistor 29 to the ON state when the counter 26 is reset. Then, the comparator 28 turns the power transistor 29 to the OFF state when the count of the counter 26 becomes equal to ADD 2 read from the EGI register 25.

Figure 4:
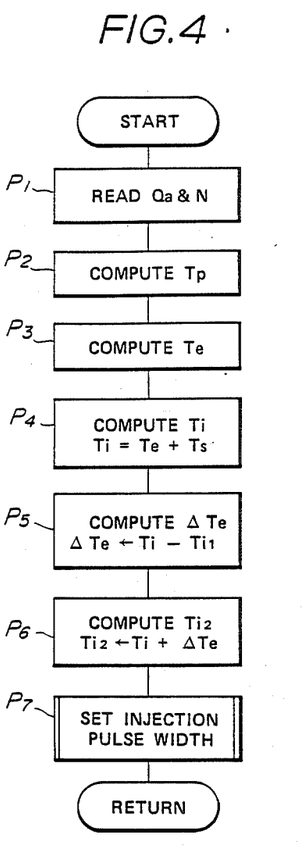
FIG. 4 is a flow chart showing a fuel injection quantity determining program used in the first embodiment.

The control system shown in FIGS. 2 and 3 is operated as follows:

FIG. 4 shows a program for computing a fuel supply quantity. This program is stored in the ROM 12, and executed once each time a predetermined time interval (10 ms, for example) elapses.

At a step P1, the CPU 11 reads the amount of the intake air Qa and the engine rpm N. It is possible to determine N by measuring the time duration between successive occurrences of reference signals of the crank angle sensor 9 (which are produced every 360° of crankshaft revolution), or by counting occurrences of position pulse signals (produced every 1°) within a predetermined time length.

At a next step P2, the CPU 11 determines a base injection quantity Tp according to the following equation (1):

$$Tp = K \cdot Qa/N \quad (1)$$

where K is a predetermined constant.

Then, at a step P3, the CPU 11 determines an effective injection pulse width (or duration) Te by correcting the basic injection quantity Tp in accordance with various driving conditions such as a coolant temperature so as to meet various requirements. The effective injection pulse width Te is corresponding to the fuel quantity per one crankshaft revolution. Therefore, Te is equivalent to the half of the fuel quantity required in the 720° (two-revolution) four-stroke cycle.

At a step P4, the CPU 11 determines an actual injection pulse width Ti by adding a battery voltage correction (ineffective pulse width) Ts to the effective pulse width Te. The voltage correction Ts is added to compensate for variation of the effective valve opening time of the injector caused by variation of the battery voltage which drives the injectors. The actual fuel supply is determined only by the effective pulse width Te.

At a step P5, the CPU 11 determines a compensation quantity $\Delta Te$ which is a difference between a first fuel injection pulse width $Ti_1$ used in first injection and a current valve of the fuel injection pulse width Ti. That is;

$$\Delta Te = Ti - Ti_1 \qquad (2)$$

The compensation quantity $\Delta Te$ is a quantity used to compensate for excess or defficiency in the fuel supply.

At a step P6, the CPU 11 determines a second injection pulse width $Ti_2$ by adding the compensation quantity $\Delta Te$ to the current value of Ti.

At a step P7, the CPU 11 stores the currently determined values of Ti and $Ti_2$ in two selected from the EGI registers 25 of the I/O port 15 according to a subroutine of FIG. 6 as explained later, and delivers the injection signals Si to the injectors 4.

In this fuel injection system, each cylinder is provided with the injector, and the instants of the first and second injections are different from cylinder to cylinder. Therefore, each cylinder is provided with two memory locations, one for storing the first injection pulse width $Ti_1$ of that cylinder and the other for storing the second injection pulse width $Ti_2$. The steps P5 and P6 are performed cylinder by cylinder.

Figure 5:
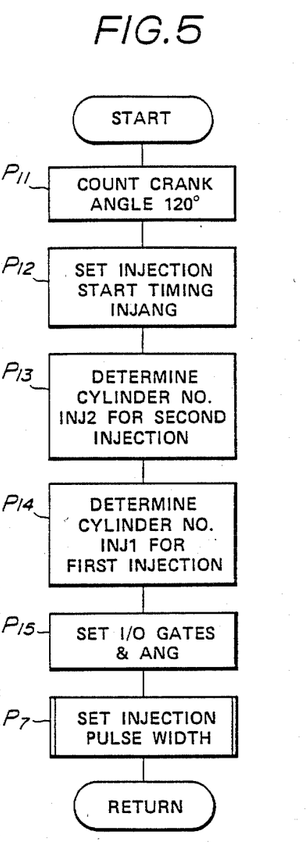
FIG. 5 is a flow chart showing an injection timing determining program used in the first embodiment.

FIG. 5 shows a program for determining the fuel injection timing. The program of FIG. 5 is executed each time the 120° signal is produced by the crank angle sensor 9 in the case of a six-cylinder engine.

At a step P11, the CPU 11 counts occurrences of the 120° signal of the crank angle sensor 9. At a step P12, the CPU 11 determines the timing INJANG of a start of the second injection. This second injection start timing INJANG is determined so as to enable the injected fuel to enter the combustion chamber of the cylinder before the closure of the intake valve. That is, an instant at which the second fuel injection is finished is earlier by a predetermined time interval (shown in FIGS. 8 and 9) than an instant at which the intake valve is closed. The time interval between the end of the second fuel injection and the closure of the intake valve is determined in consideration of a transport time of the fuel from the injector to the intake valve, and the compensation quantity Te. The fuel injection start timing INJANG is data having two place, an upper place for angles of 120° and a lower place for angles of 1°.

At a step P13, the CPU 11 compares the angular position of the crankshaft detected at the step P11 and the number of the upper place of INJANG, and by so doing determines a cylinder number INJ2 indicating the number of the cylinder which is to receive the second fuel injection within a 120° angular displacement (one third revolution) of the crankshaft. At a step P14, the CPU determines another cylinder number INJ1 indicating the cylinder which is to receive the first fuel injection within the same 120° angular displacement. In this embodiment, INJ1 is determined from INJ2 obtained at the step P13. The cylinder indicated by INJ1 is the next cylinder but two in the order of the cylinders with respect to the cylinder indicated by INJ2. For example, INJ1 indicates the No. 1 cylinder when INJ2 indicates the No. 4 cylinder, and INJ1 indicates the No. 2 cylinder when INJ2 does the No. 5 cylinder. The injection timing of the cylinder indicated by INJ1 is advanced by 360° relative to the timing of INJ2. However, it is optional to employ any other appropriate injection timing schedule.

At a step P15, the CPU 11 sets the fuel injection timing by entering the data of the lower place for 1° angles of INJANG into the ANG register 21 of the I/O port 15, and turning the gate inputs corresponding to the cylinders of INJ1 and INJ2 to the ON state. The final step P7 following the step P15 is the same as the step P7 of FIG. 4.

Figure 6:
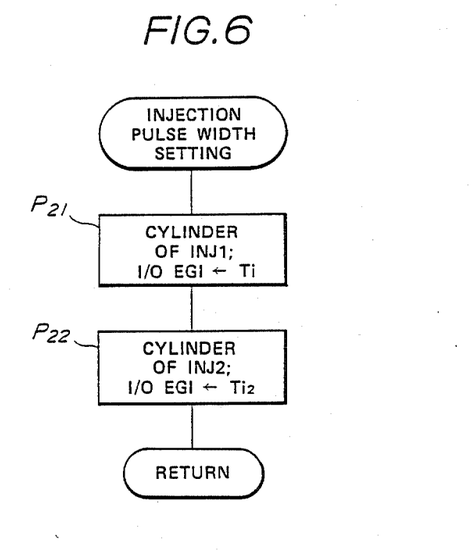
FIG. 6 is a flow chart showing a fuel injection pulse width setting program used in the first and second embodiments.

FIG. 6 shows a subroutine for setting the injection pulse widths. The subroutine of FIG. 6 is corresponding to the step P7 shown in FIGS. 4 and 5. The subroutine of FIG. 6 is executed both when the timer interrupt of FIG. 4 is performed, and when the interrupt of FIG. 5 is caused by the crank angle signal.

At a step P21 of FIG. 6, the CPU 11 enters the current value of the fuel injection pulse width Ti into the EGI register 25 corresponding to the cylinder indicated by INJ1 as the first injection pulse width $Ti_1$. At a step P22, the CPU 11 enters the second injection pulse width $Ti_2$ into the EGI register 25 corresponding to the cylinder indicated by INJ2.

When the crank angle reaches the position set by the ANG register 21, the injection start angle control circuit 24 triggers the sections of the injection pulse width output circuit 30 designated by INJ1 and INJ2, and the triggered sections drives the corresponding injectors in accordance with the injection pulse widths stored in the EGI registers 25, respectively.

Figure 7:
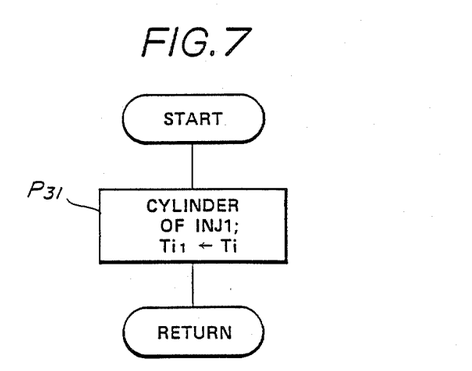
FIG. 7 is a flow chart showing a fuel injection pulse width storing program used in the first and second embodiments.

FIG. 7 shows a program for storing the first injection pulse width $Ti_1$. The program of FIG. 7 is executed each time the injection start angle control circuit 24 triggers the sections of the circuit 30. At a step P31, the CPU 11 stores the fuel injection pulse width Ti in the memory location $Ti_1$ used for storing the first fuel injection pulse width $Ti_1$ for the cylinder indicated by INJ1.

Figure 9:
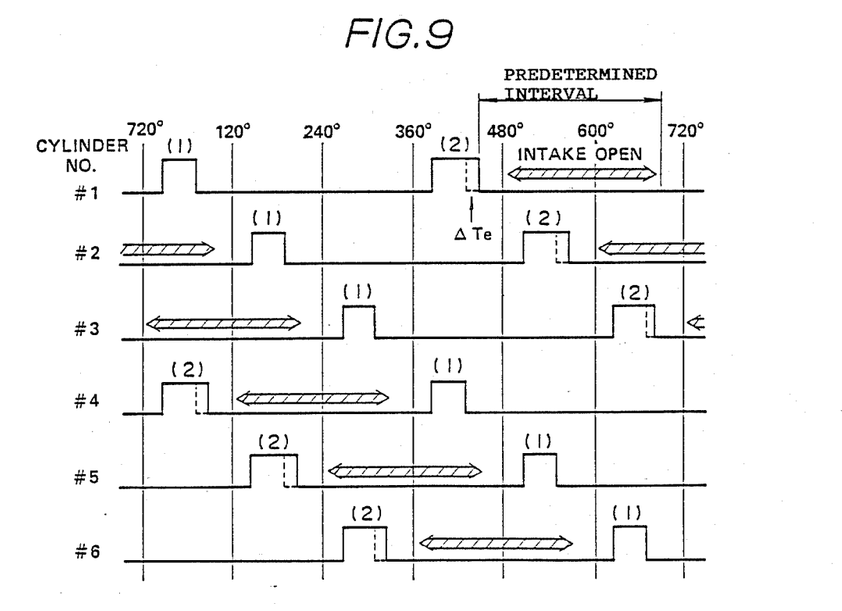

FIG. 9 shows the fuel injection timing schedule of this embodiment. The fuel injection control system of this embodiment injects fuel to each cylinder twice in every engine operating cycle. In each cylinder, the first fuel injection indicated by (1) in FIG. 9 is performed sufficiently long before the intake open period (indicated by hatching in FIG. 9) during which the intake valve is open. The second injection indicated by (2) is performed shortly before the intake open period. The first injection (1) of each cylinder is performed simultaneously with the second injection of the cylinder which is the next cylinder but two, and whose timing is retarded by 360°, as shown in FIG. 9. For example, in the interval between 720° and 120° shown in FIG. 9, the first injection of the No. 1 cylinder and the second injection of the No. 4 cylinder are performed simultaneously, but their durations are generally different. In the next interval between 120° and 240°, the first injection of the No. 2 cylinder and the second injection of the No. 5 are performed simultaneously.

The fuel quantity required for each cycle of each cylinder is divided between the first injection (1) and the second injection (2) at the ratio of $\frac{1}{2}:\frac{1}{2}$, and an excess or deficiency $\Delta Te$ of the fuel supply caused by a variation of the engine load between the instant of the first injection and the instant of the second injection is compensated at the time of the second injection. When, for example, the load indicated by the intake air flow rate Qa is increased as shown in FIG. 8, an increase of the fuel supply due to an increase of the engine load is added to $Te_2$ at the time of the second injection. Therefore, the total fuel quantity supplied by the first and second injections amounts to $Te_1 + (Te_2 + \Delta Te) = Te_2 \times 2$. Thus, the control system can provided satisfactory drivability and fuel consumption in both steady state and transient state by adapting the fuel supply to changes of the engine load.

In this embodiment, the fuel quantity per cycle is divided between the first and second injections at the ratio of $\frac{1}{2}:\frac{1}{2}$. However, it is possible to employ an arbitrary distribution ratio, $a/(a+b):b/(a+b)$. In this case, the total fuel quantity $Te_2 \times 2$ of the first and second injections can be obtained by setting the fuel quantities of the first and second injections and the compensation quantity as expressed by the following equation (3);

$$\frac{a}{a+b} Te_1 \times 2 + \frac{b}{a+b} Te_2 \times 2 + \frac{a(Te_2 - Te_1)}{a+b} \times 2 = Te_2 \times 2 \quad (3)$$

where $\frac{a}{a+b} Te_1 \times 2 =$ the quantity of the first injection, $\frac{a}{a+b} Te_2 \times 2 =$ the unmodified quantity of the second injection, $\frac{a(Te_2 - Te_1)}{a+b} \times 2 =$ the compensation quantity, and, a and b are constants.

When the engine load is decreased during deceleration, for example, the control system of this embodiment naturally decreases the fuel quantity of the second injection so as to remove an excess of the fuel supply due to a decrease of the engine load.

Of course, the present invention is applicable not only to six-cylinder engines but also to four-cylinder engine or other engines.

A second embodiment of the present invention is shown in FIGS. 10-13. A fuel injection control system of the second embodiment is designed to supply the total fuel quantity required per cycle in the first injection and supply the compensation quantity in the second injection.

The control system of the second embodiment has the same components as the control system of the first embodiment has, and these components are arranged in the same manner as shown in FIGS. 2 and 3. However, the second embodiment uses control programs shown in FIGS. 10 and 11 instead of the programs of FIGS. 4 and 5. The programs of FIGS. 6 and 7 are also used in the second embodiment. Therefore, FIGS. 2, 3, 6 and 7 are common to both the first and second embodiments.

Figure 10:
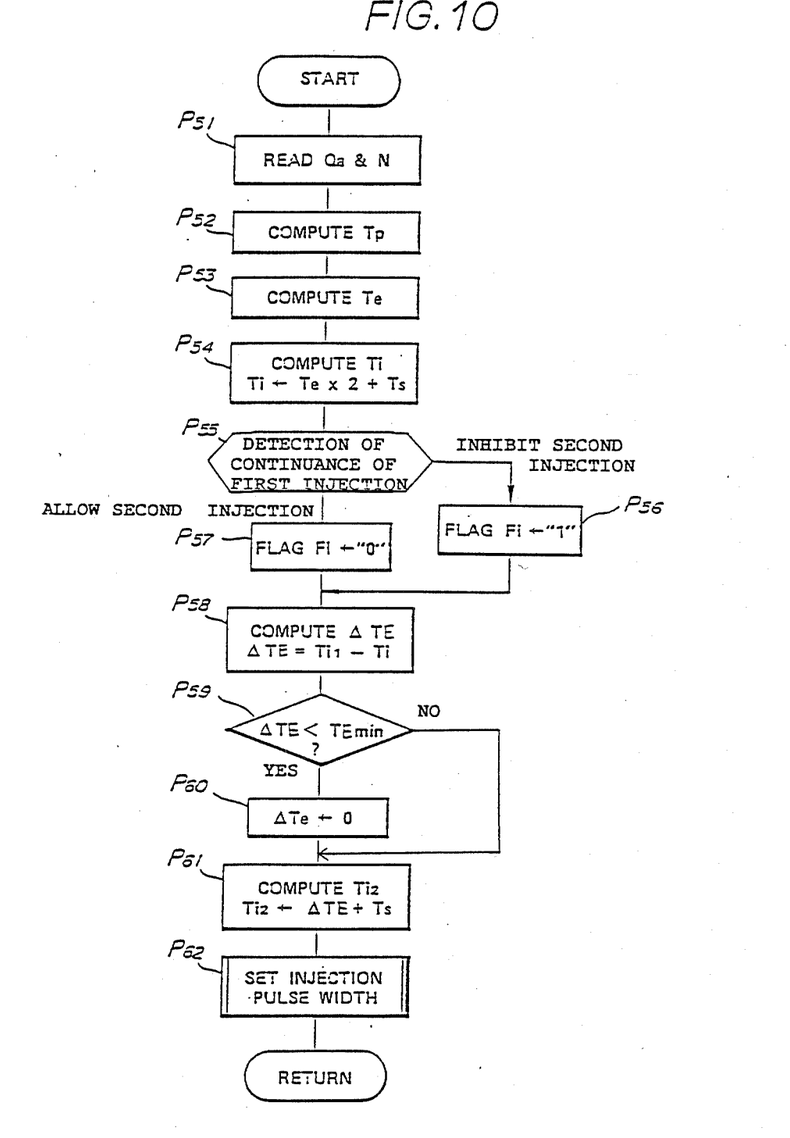
FIG. 10 is a flow chart showing a fuel injection quantity determining program used in the second embodiment.

FIG. 10 shows a program for determining a fuel injection quantity. The program of FIG. 10 is stored in the ROM 12, and repeated at regular intervals of a predetermined time length (10 ms, for example).

Steps P51–P53 are substantially identical to the steps P1–P3 of FIG. 4, respectively. The effective injection pulse width Te is corresponding to the fuel quantity per crankshaft revolution. Therefore, the quantity required for each four-stroke, two-revolution cycle is twice as much as Te.

At a step P54, the CPU 11 of the second embodiment determines an actual fuel injection pulse width Ti corresponding to the total quantity per cycle, according to the following equation (4);

$$Ti = Te \times 2 + Ts \quad (4)$$

Since Ts is the voltage correction as mentioned before, the actual fuel supply is determined by $T_e \times 2$. Steps P55–P57 are steps for determining whether or not to inhibit the second injection. At the step P55, the CPU 11 determines whether the first injection will continue until a start of the second injection, or the first injection can be finished before the start of the second injection. In this embodiment, the CPU 11 compares an angular distance $\theta$ moved by the crankshaft during the first injection with a predetermined angle $\theta_0$. The angular distance $\theta$ is calculated by using the following equation (5).

$$\theta = \frac{Ti \text{ [ms]}}{1000} \times \frac{N \text{ [rpm]}}{60} \times 360 \text{ [degrees]} \quad (5)$$

The predetermined angle $\theta_0$ is determined from the interval between the start of the first injection and the start of the second injection so as to allow a margin of angle. When $\theta > \theta_0$, the CPU 11 proceeds from the step P55 to the step P56, and sets a second injection inhibit flag FI (FI=1). When $\theta > \theta_0$, the CPU 11 resets the flag FI (FI=0) at a step P57. If the injection pulse of the second injection is started while the pulse of the first injection still continues, it becomes difficult or impossible to correctly supply the fuel of the quantity corresponding to Ti. The steps P55–P57 are inserted to avoid such a problem. The control system of this embodiment is arranged to inhibit the second injection by predicting, at the time of calculation of the fuel quantity of the first injection, an overlap between the pulse of the first injection and the pulse of the second injection. However, it is possible to employ another arrangement in which, at the time of start of the second injection, the CPU 11 determines whether the injector is in action or not by receiving a signal indicative of the state of the injector valve through the I/O port 15, and inhibits the second injection if the injector is still in action.

At a step P58 following the step P56 or P57, the CPU 11 determines a compensation quantity $\Delta TE (= Ti-Ti_1)$ which is the difference between the current value of the injection pulse width Ti and the pulse width $Ti_1$ which was used in the first injection, as expressed by the equation (2).

At a step P59, the CPU 11 compares the compensation quantity $\Delta TE$ with a predetermined value Temin. If $\Delta TE$ is smaller than TEmin, or if $\Delta TE$ is negative, the CPU 11 does not allow the compensation for an excess or deficiency of the fuel supply by setting the compensation quantity TE equal to zero at a step P60. If ΔTE is equal to or greater than Temin, the CPU 11 proceeds directly from the step P59 to a step P61 bypassing the step P60. When the injection pulse width is too small, the accuracy of the injectors in controlling the injection quantity are generally degraded, so that adverse influence is exerted on the air fuel ratio control, and the fuel is consumed uselessly. The steps P59 and P60 are interposed to meet such problems.

At the step P61, the CPU 11 determines the second injection pulse width $Ti_2$ by adding the voltage correction Ts to the compensation quantity ΔTE ($Ti_2 = \Delta TE + Ts$).

At a step P62, the CPU 11 stores the currently determined values of Ti and $Ti_2$ in the EGI registers 25 of the I/O port 15 according to the subroutine of FIG. 6, and delivers the injection signals to the injectors 4. As in the first embodiment, a memory for storing the first injection pulse width $Ti_1$ and a memory for storing the second injection pulse width are provided for each cylinder, and the steps P58–P61 are performed cylinder by cylinder.

Figure 11:
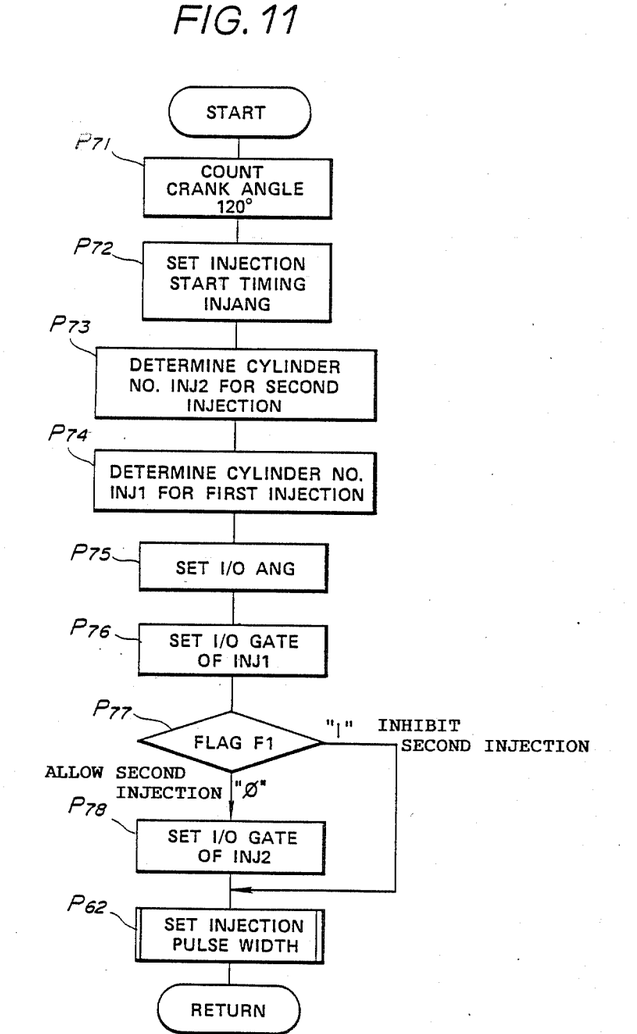
FIG. 11 is a flow chart showing a fuel injection timing setting program used in the second embodiment.

FIG. 11 shows a program for determining the fuel injection timing. In the case of a six-cylinder engine, the program of FIG. 11 is performed at intervals of 120°.

Steps P71–74 of FIG. 11 are substantially identical to the steps P11–P14, respectively. Like the first embodiment, the CPU 11 of the second embodiment enters the data in the lower place for 1° of INJANG into the ANG register 21 of the I/O port 15 at a step P75. At a step P76, the CPU 11 turns only the gate input corresponding to INJ1.

At a step P77, the CPU 11 determines whether the second injection inhibit flag FI is set or not. If the flag FI is cleared (FI=0), then the CPU 11 allows the second injection by turning the gate input of INJ2 to the ON state at a step P78. If FI is set (FI=1), then the CPU 11 inhibits the second injection by proceeding to the step P62 without setting the gate of INJ2. The step P62 of FIG. 11 is identical to the step P62 of FIG. 10.

The CPU 11 of the second embodiment executes the program of FIGS. 6 and 7 in the same manner as in the first embodiment.

Figure 12:
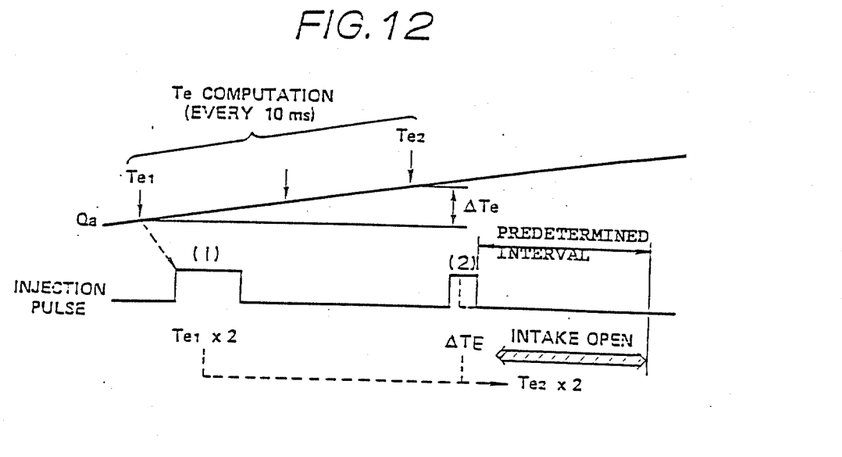
FIGS. 12 and 13 are timing charts showing operations of the fuel injection control system of the second embodiment.
Figure 13:
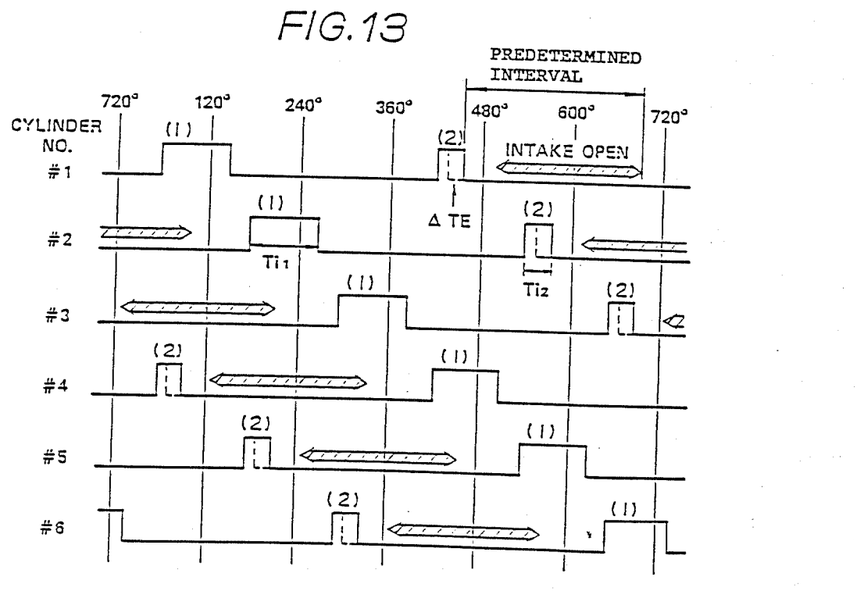

FIGS. 12 and 13 show operations of the control system of the second embodiment. In the second embodiment, the quantity $Te_1 \times 2$ is supplied in the first injection, and the compensation quantity ΔTE is added in the second injection, so that the total quantity amounts to $Te_1 \times 2 + \Delta Te \times 2 = Te_2 \times 2$. Therefore, the control system of the second embodiment can provide satisfactory drivability and fuel economy. In the second embodiment, the response and control accuracy can be further improved even in idling operation because the total quantity is supplied in the first injection.

What is claimed is:

1. A fuel injection control system for an internal combustion engine, comprising;
   means for sensing a load of the engine,
   means for sensing a crank angle of the engine,
   injection timing determining means for determining a timing of a first fuel injection to be performed in each operating cycle of the engine, and a timing of a second fuel injection to be performed after the first fuel injection in each cycle of the engine,
   injection quantity determining means for determining a first injection quantity of fuel to be supplied by the first injection and a second injection quantity of the fuel to be supplied by the second injection, said injection quantity determining means comprising first means connected with said load sensing means for determining a desired fuel quantity in accordance with the load of the engine, second means for determining said first injection quantity from said desired quantity, third means for determining a compensation quantity for compensating for a change in said desired quantity between a time of the first injection and a time of the second injection, and fourth means for determining said second injection quantity from said compensation quantity,
   output means connected with said crank angle sensing means, said timing determining means and said quantity determining means for producing a first fuel injection signal indicative of said first injection quantity, and a second fuel injection signal indicative of said second injection quantity, and
   injector means for supplying the fuel to the engine by spraying the fuel twice in each cycle in response to said first and second injection signals.

2. An injection control system according to claim 1 wherein said third means of said quantity determining means includes means for subtracting an old value of said desired quantity which has been used for determining said first quantity, from a new value of said desired quantity which has been determined more recently than said old value, and determining said compensation quantity so that said compensation quantity is proportional to a difference between said old and new values.

3. An injection control system according to claim 2 wherein said second means of said quantity determining means includes means for determining said first injection quantity which is equal to said old value of said desired quantity times a predetermined constant coefficient times a first fraction resulting from division of a first constant greater than zero by a sum of said first constant and a second constant equal to or greater than zero, and said third means includes means for determining said compensation quantity which is equal to said difference times said predetermined coefficient times said first fraction, said fourth means includes means for determining said second injection quantity which is equal to a sum of said compensation quantity and a sum and quantity which is equal to said new value of said desired quantity times said predetermined coefficient times a second fraction resulting from division of said second constant by said sum of said first and second constants.

4. An injection control system according to claim 3 wherein said quantity determining means further comprises means for storing said old value of said desired quantity, and providing said old value to said third means.

5. An injection control system according to claim 4 wherein said third and fourth means are arranged to determine, respectively, said compensation quantity and said second injection quantity immediately before each occurrence of said second fuel injection which is timed to occur a predetermined interval before an end of an intake open period in each operating cycle of the engine, and said second means is arranged to determine said first injection quantity immediately before each occurrence of said first fuel injection which is timed to occur longer before the end of the intake open period in each cycle than said second fuel injection.

6. An injection control system according to claim 5 wherein said injector means comprises a plurality of injectors which are assigned to a plurality of cylinders of the engine in a manner of one to one correspondence, and timed by said timing determining means so that each of said first and second fuel injections occurs in the cylinders, one cylinder after another in a predetermined order, and said third means includes means for storing a value of said desired quantity and determining said compensation quantity separately for each individual cylinder.

7. An injection control system according to claim 6 wherein said timing determining means includes means for timing said first and second fuel injections so that said first injection of one cylinder and said second injection of another cylinder occur simultaneously, and said quantity determining means determines said first injection quantity for one cylinder and said second injection quantity for another cylinder simultaneously.

8. An injection control system according to claim 7 wherein each of said first and second fractions is equal to one half.

9. An injection control system according to claim 7 wherein said first fraction is equal to one, and said second fraction is equal to zero.

10. An injection control system according to claim 9 wherein said fourth means includes means for setting said second injection quantity equal to zero if said compensation quantity is smaller than a predetermined value.

11. An injection control system according to claim 10 wherein said quantity determining means includes means for preventing said second fuel injection if there exists a predetermined condition indicative of a possibility of occurrence of said second injection before an end of said first injection in one cylinder.

* * * * *